UNITED STATES PATENT OFFICE.

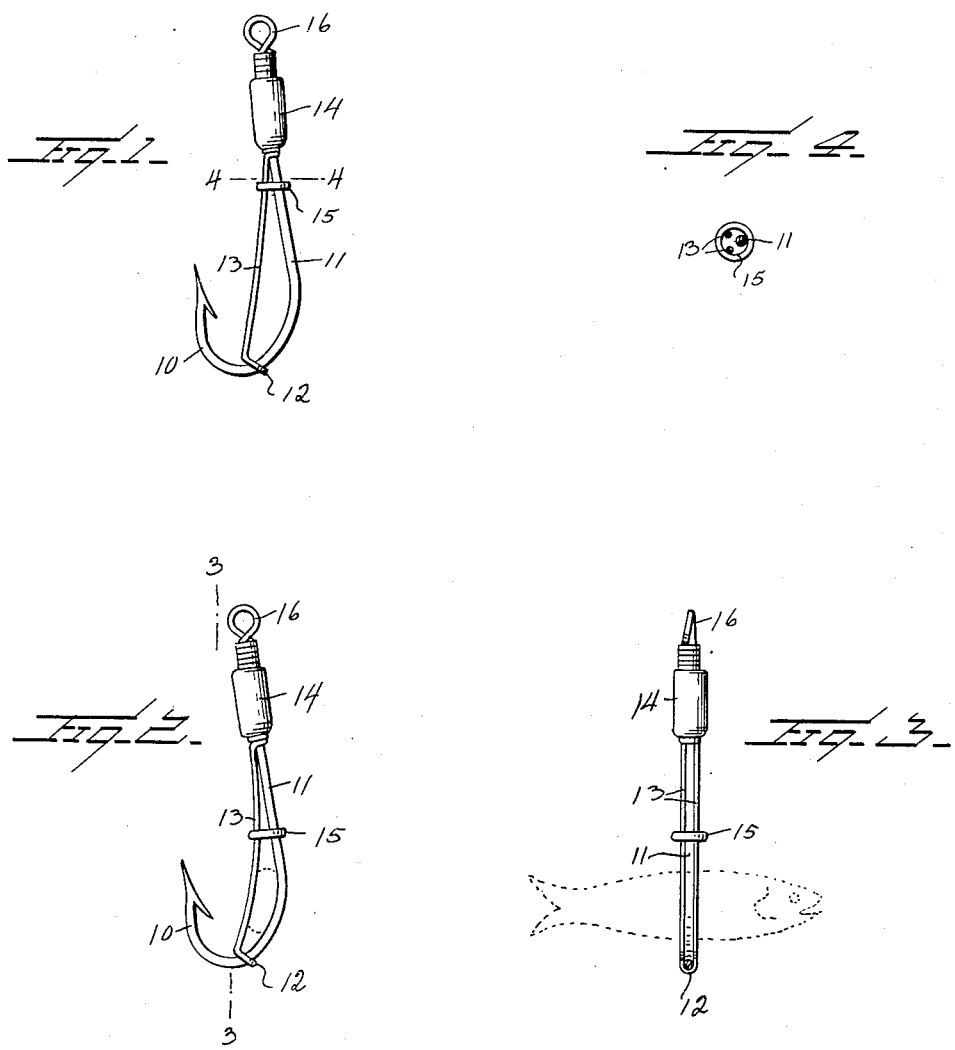

JACOB JONES, OF RINGLING, MONTANA, ASSIGNOR OF ONE-FOURTH TO ROSE V. ANDERSON, ONE-FOURTH TO ANNIE NOKES, AND ONE-FOURTH TO TILLIE THIES, ALL OF BUTTE, MONTANA.

LIVE-BAIT HOOK.

1,323,394.     Specification of Letters Patent.     Patented Dec. 2, 1919.

Application filed May 17, 1919. Serial No. 297,867.

*To all whom it may concern:*

Be it known that I, JACOB JONES, a citizen of the United States, residing at Ringling, in the county of Meagher and State of Montana, have invented certain new and useful Improvements in Live-Bait Hooks, of which the following is a specification, reference being had to the accompanying drawings.

This invention relates to fishing hooks, and particularly to fishing hooks designed to support live bait.

It is a very difficult matter to attach live bait to a fish hook with any certainty that the bait will remain in place on the hook and without killing the bait.

The general object of my invention is to provide a very simple hook so constructed that live bait may be readily attached thereto, and further so constructed that there will be no chance for the bait to escape from the hook, the bait being held on the hook, however, by means which will not cause the death of the live bait.

A further object is to provide a device of this character which will not render the hook unattractive to fish and which is simple in construction and effective in use.

Other objects will appear in the course of the following description.

My invention is illustrated in the accompanying drawings, wherein:

Figure 1 is a perspective view of a hook constructed in accordance with my invention;

Fig. 2 is a like view to Fig. 1, but showing the bait clasp or clamp drawn against the bait;

Fig. 3 is an edge elevation showing the bait in dotted lines; and

Fig. 4 is a section on the line 4—4 of Fig. 1.

Referring to these figures, it will be seen that the hook 10 is of the usual form, but that attached to the base of the shank 11 is a bait clamp consisting of a single piece of resilient wire bent intermediate its ends, as at 12, to provide two legs 13 extending rearward approximately parallel to the shank of the hook and at their ends attached to a head 14, in turn attached to the shank of the hook adjacent its extremity. The outer end 12 of the wire clamp, after the clamp is put in place, is angularly bent so as to prevent this clamp being pushed back beyond the bight of the hook.

The resilience of the wire of which the clamp is made normally forces it outward from the shank. A ring 15 is disposed over the shank and clamp and is held from detachment over the point of the hook by the angular bend at 12. Normally this ring will be disposed adjacent the head 14. When it is desired to attach live bait to the hook, the bait is disposed between the shank and the clamp and then the ring slid up until it forces the clamp tightly against the bait.

It will be noted that there is a three point engagement with the bait, that is the bait is clamped by the two legs 13 on one side and by the shank 11 on the other side which is disposed in a plane between the planes of the two legs. Of course, the line is attached to the hook in the ordinary manner by means of a swivel, ring, or eye 16.

My device permits live bait to be readily applied to the hook and readily clamped thereon without any puncture of the bait which would cause it to bleed and lose its attractiveness. The bait is held sufficiently tightly as to prevent its detachment from the hook, but not to prevent its movement. The bait may be readily removed to permit new bait to be put in place. The clamp may be used with ordinary bait in the usual manner by simply sliding the ring 13 down toward the extremity of the bait clamp, in which position it will hold the bait clamp parallel to the shank.

I claim:

1. A fish hook comprising a bill and a shank, a bait clamp consisting of a length of resilient wire bent intermediate its ends to form an elongated loop, the loop being disposed over the bill of the hook, and the two legs thereof extending rearward in convergent relation to the shank and attached thereto at their rear ends, and a ring slidable on the shank and clamp to force the clamp toward the shank, the loop having a length less than the distance from the point of attachment of the loop to the shank to that portion of the hook most distant from this point of attachment.

2. A fish hook comprising a bill and a shank, a clamp consisting of a length of resilient wire bent intermediate its ends to form an elongated loop, the loop being passed over the bill of the hook and the two legs of the loop extending rearward in convergent relation to the shank and attached thereto at their rear ends, the extremity of the clamp being angularly bent away from the bill, and a ring slidable on the shank and clamp to force the clamp toward the shank, the ring being prevented from detachment by the angular bend at the extremity of the clamp.

In testimony whereof I hereunto affix my signature in the presence of two witnesses.

JACOB JONES.

Witnesses:
L. J. GRIFFIN,
HOYT SHEPARD.